United States Patent
Frey et al.

(10) Patent No.: US 11,131,218 B2
(45) Date of Patent: Sep. 28, 2021

(54) PROCESSES FOR ADJUSTING AT LEAST ONE PROCESS CONDITION OF A CHEMICAL PROCESSING UNIT WITH A TURBINE

(71) Applicant: UOP LLC, Des Plaines, IL (US)

(72) Inventors: Stanley Joseph Frey, Palatine, IL (US); James W. Harris, Palatine, IL (US)

(73) Assignee: UOP LLC, Des Plaines, IL (US)

(\*) Notice: Subject to any disclaimer, the term of this patent is extended or adjusted under 35 U.S.C. 154(b) by 325 days.

(21) Appl. No.: 15/923,997

(22) Filed: Mar. 16, 2018

(65) Prior Publication Data

US 2019/0284950 A1     Sep. 19, 2019

(51) Int. Cl.
*F01K 23/06*     (2006.01)
*F01D 17/16*     (2006.01)
(Continued)

(52) U.S. Cl.
CPC ............ *F01K 23/064* (2013.01); *F01D 15/10* (2013.01); *F01D 17/16* (2013.01); *F01D 21/14* (2013.01);
(Continued)

(58) Field of Classification Search
CPC ........ F01D 15/10; F01D 17/14; F01D 17/141; F01D 17/145; F01D 17/16; F01D 17/162; F01D 17/165; F01D 17/18; F01D 21/12; F01D 21/14; F01K 23/064; F05D 2220/31; F05D 2220/62; F05D 2220/76;
(Continued)

(56) References Cited

U.S. PATENT DOCUMENTS 4,285,481 A    8/1981   Biscomb
4,455,614 A    6/1984   Martz et al.
(Continued)

FOREIGN PATENT DOCUMENTS

CN    102203780 A    9/2011
CN    103917280 A    7/2014
(Continued)

OTHER PUBLICATIONS

Frey, Stanley Joseph, et al., U.S. Appl. No. 15/923,990, filed Mar. 16, 2018 and entitled "Turbine with Supersonic Separation".
(Continued)

*Primary Examiner* — Courtney D Heinle
*Assistant Examiner* — Sang K Kim

(57) ABSTRACT

Processes for controlling at least one process condition of a chemical processing unit with a turbine. In the processes, a flow of a fluid is adjusted with a turbine in order to provide the fluid with a flow associated with at least one process condition of a chemical processing unit. The turbine wheel is rotated within the turbine, and the turbine wheel is configured to transmit rotational movement to an electrical generator. The resistance of the turbine is modulated and adjusts the flow of the fluid through the turbine. A response time of at least one steady state process condition to a new steady state process condition of at least 10% difference is at least one second to reach 50% of the difference between the at least one steady state process condition and the new steady state process condition after modulating the resistance of the turbine.

19 Claims, 2 Drawing Sheets

Figure 1:
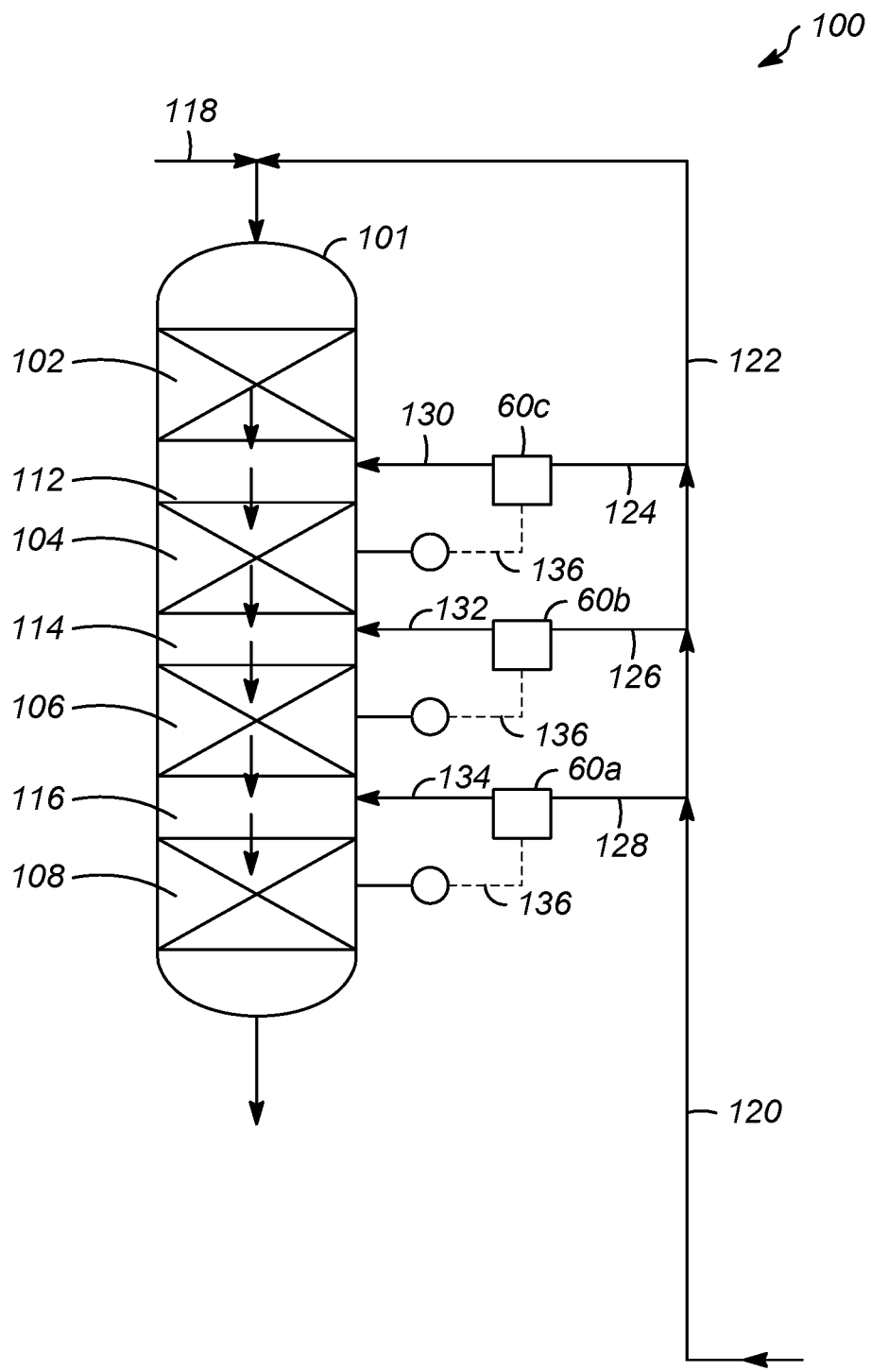

(51) Int. Cl.
*F01D 15/10* (2006.01)
*F01D 21/14* (2006.01)

(52) U.S. Cl.
CPC ...... *F05D 2220/31* (2013.01); *F05D 2220/62* (2013.01); *F05D 2220/76* (2013.01); *F05D 2270/052* (2013.01); *F05D 2270/62* (2013.01)

(58) Field of Classification Search
CPC ........... F05D 2270/052; F05D 2270/62; C10G 11/187; C10G 45/72; C10G 47/36; C10G 49/26
See application file for complete search history.

(56) References Cited

U.S. PATENT DOCUMENTS

| | | | |
|---|---|---|---|
| 5,384,489 | A | 1/1995 | Bellac |
| 6,009,711 | A | 1/2000 | Kreiger et al. |
| 6,261,055 | B1 | 7/2001 | Owczarek |
| 6,265,453 | B1 | 7/2001 | Kennedy |
| 6,354,084 | B1 | 3/2002 | McKinley et al. |
| 6,681,155 | B1 | 1/2004 | Fujita et al. |
| 6,898,540 | B2 | 5/2005 | Davies |
| 6,962,199 | B1 | 11/2005 | Willink |
| 7,757,493 | B2 | 7/2010 | Bell et al. |
| 7,948,101 | B2 | 5/2011 | Burtch |
| 8,404,918 | B2 * | 3/2013 | Frey .................. B01D 15/1828 585/826 |
| 8,510,015 | B2 | 8/2013 | Beausoleil et al. |
| 8,763,625 | B1 | 7/2014 | Carter |
| 8,967,590 | B2 | 3/2015 | Minervini et al. |
| 9,085,499 | B2 | 7/2015 | Frey et al. |
| 9,235,228 | B2 | 1/2016 | Gazit et al. |
| 9,764,272 | B2 | 9/2017 | Martin et al. |
| 2005/0034463 | A1 | 2/2005 | Simpson et al. |
| 2008/0015839 | A1 | 1/2008 | Mahmoud Noureldin et al. |
| 2009/0125152 | A1 | 5/2009 | Skowronski et al. |
| 2011/0077448 | A1 * | 3/2011 | Frey .......................... C07C 7/11 585/826 |
| 2011/0100004 | A1 | 5/2011 | Al-Mazeedi |
| 2012/0107227 | A1 | 5/2012 | Fischer et al. |
| 2012/0118526 | A1 | 5/2012 | Sudau et al. |
| 2012/0227440 | A1 | 9/2012 | Guidati et al. |
| 2012/0245754 | A1 | 9/2012 | Mehnert |
| 2012/0260667 | A1 | 10/2012 | Chiliar et al. |
| 2012/0273394 | A1 * | 11/2012 | Banerjee ................ C10G 65/06 208/264 |
| 2012/0326443 | A1 | 12/2012 | Ginter et al. |
| 2013/0199185 | A1 | 8/2013 | Wain et al. |
| 2014/0331672 | A1 | 11/2014 | Filippi et al. |
| 2015/0118131 | A1 | 4/2015 | Martin et al. |
| 2016/0079756 | A1 | 3/2016 | Ikeyama et al. |
| 2016/0141878 | A1 | 5/2016 | Johansen |
| 2016/0161536 | A1 | 6/2016 | Amminudin |
| 2016/0252015 | A1 | 9/2016 | Kusumi et al. |
| 2016/0319198 | A1 | 11/2016 | Quanci et al. |
| 2017/0058206 | A1 | 3/2017 | Mahmoud Noureldin et al. |
| 2017/0058207 | A1 | 3/2017 | Mahmoud Noureldin et al. |
| 2017/0284307 | A1 * | 10/2017 | Inoue ...................... F01D 11/24 |
| 2019/0345837 | A1 * | 11/2019 | Bacic ...................... F01D 15/00 |
| 2019/0368374 | A1 * | 12/2019 | Hu ......................... F04D 29/464 |
| 2019/0376406 | A1 * | 12/2019 | Diamond .............. F01D 21/003 |

FOREIGN PATENT DOCUMENTS

| | | |
|---|---|---|
| CN | 104463341 A | 3/2015 |
| CN | 206538206 | 10/2017 |
| EP | 0552039 | 7/1993 |
| EP | 2778354 A1 | 9/2014 |
| FR | 2414162 | 8/1979 |
| RU | 2014114067 | 10/2015 |
| WO | 2014119569 A1 | 8/2014 |
| WO | 2014178079 A2 | 11/2014 |
| WO | 2016004014 A1 | 1/2016 |
| WO | 2016177376 A1 | 11/2016 |

OTHER PUBLICATIONS

Frey, Stanley J., et al., U.S. Appl. No. 62/644,086, filed Mar. 16, 2018 and entitled "System for Consolidation and Use of Power Recovered from A Turbine in a Process Unit".

Frey, Stanley J., et al., U.S. Appl. No. 62,644,104, filed Mar. 16, 2018 and entitled "System for Power Recovery from Quench and Dilution Vapor Streams ".

Frey, Stanley Joseph, et al., U.S. Appl. No. 15/924,037, filed Mar. 16, 2018 and entitled "Power Recovery from Quench and Dilution Vapor Streams".

Frey, Stanley J., U.S. Appl. No. 15/923,936, filed Mar. 16, 2018 and entitled "Energy-Recovery Turbines for Gas Streams".

Frey, Stanley J., et al., U.S. Appl. No. 15/923,945, filed Mar. 16, 2018 and entitled "Consolidation and Use of Power Recovered from a Turbine in a Process Unit".

Frey, Stanley J., et al., U.S. Appl. No. 15/923,964, filed Mar. 16, 2018 and entitled "Process Improvement through the Addition of Power Recovery Turbine Equipment in Existing Processes".

Harris, James W., et al., U.S. Appl. No. 15/924,034, filed Mar. 16, 2018 and entitled "Use of Recovered Power in a Process".

Frey, Stanley Joseph, et al., U.S. Appl. No. 15/923,978, filed Mar. 16, 2018 and entitled "Hydroprocessing Unit with Power Recovery Turbines".

Harris, James W., et al., U.S. Appl. No. 15/923,995, filed Mar. 16, 2018 and entitled "Steam Reboiler with Turbine".

Tsourapas, Vasilios, Control Analysis of Integrated Fuel Cell Systems with Energy Recuperation Devices, 2007.

The Elliot Group, Maximize the Efficiency of your Steam Process, 2014.

U.S. Department of Energy, Replace Pressure-Reducing Valves with Backpressure Turbogenerators.

Mechanical Solutions, Inc., Replacing a Pressure Reducing Valve with a Hydro Turbine for a Municipal Water Supply, Jul. 19, 2016.

International Search Report from corresponding PCT application No. PCT/US2019/022449, dated Jun. 20, 2019.

Guitiérrez-Antonio, Claudia, et al., Intensification of the hydrotreating process to produce renewable aviation fuel through reactive distillation, Science Direct, vol. 124, Feb. 2018.

Mohammadzadeh, Ashkan, et al., Design of a wind turbine model for clean energy. Case study: Khorasan Razavi regional electricity company, Acta Technica, 62, No. 4B/2017-1-8.

* cited by examiner

PROCESSES FOR ADJUSTING AT LEAST ONE PROCESS CONDITION OF A CHEMICAL PROCESSING UNIT WITH A TURBINE

FIELD OF THE INVENTION

This invention relates generally to processes for adjusting a process condition, and more particularly to processes wherein a steady state process condition is adjusted with a turbine, and more specifically by modulating a resistance of the turbine.

BACKGROUND OF THE INVENTION

Chemical refining and processing methods frequently involve gaseous or vapor streams that are passed through control valves. The control valves are used to lower the pressure of the gaseous streams to provide the gaseous stream with a desired characteristic, for example, pressure, temperature, etc. In the control valve, mechanical energy is dissipated to decrease the flow rate and pressure. Since the energy removed, via the pressure reduction, is dissipated without recovery by the control valve, the energy is lost.

Moreover, because the energy removed often is a result of energy added to the system, the lost energy can represent a higher operating cost. This lost energy results in minimal temperature reduction versus the pressure reduction via an adiabatic pressure reduction across the control valve. Thus, there is an inherent inefficiency in the process associated with supplying energy only to remove it without recovery. However, since the costs of supply in the energy are relatively small in the overall process, refiners and processors often operate the processing/refining unit with this inefficiency to maintain throughput of the processing/refining unit. Nevertheless, this inefficiency is an opportunity for processors to lower operating costs and, thus increase profits.

It has recently been discovered by the applicant that the control valves can be replaced with turbines to address these problems. The turbines allow for the same pressure reduction to occur. However, unlike the control valves, the turbines convert the removed energy into electrical energy to be utilized elsewhere. Thus, the turbine provides an advantage to the traditional control valves.

SUMMARY OF THE INVENTION

The present invention provides devices and processes for using the turbines in some chemical processing units.

Accordingly, in the present invention, the control valves are utilized to adjust a process condition of the processing unit. For example, for a hydroprocessing reactor, the turbine is used on a line for a hydrogen-containing vapor stream to provide a quench stream to obtain a desired temperature within the reactor. Additionally, for an FCC unit, the turbine is used on a line with a stream of steam that changes the hydrocarbon partial pressure within the FCC unit. In changing these process conditions, the changes are implemented via a "slow control" change in which the desired change occurs at a relatively slow pace. By "slow control", it is meant that a response time to achieve at least 50% of the change between a new steady state process condition and a starting (or original) steady state process condition, when the new steady state process condition varies from the starting steady state process condition by at least 10%, is at least one second, or at least ten seconds, or at least one minute, or at least 10 minutes, or an hour or more.

Using a turbine to control the flow stream without the assistance of a control valve can greatly increase the amount of recovered power (up to about 30% more) from the power recovery turbine and provide more cooling to the process stream which can often provide more process advantages. If slow control response of the turbine is an issue then limiting use of the turbine to slow responding or "loose" control point applications is more advantageous than in fast control systems where the turbine response is too sluggish. Flow control turbines using a variable nozzle turbine, inlet variable guide vanes, or changing the electromagnetic resistance to rotation via direct coupled variable electric load, to name a few, are used to modulate (or change) the resistance of the turbine, and increase or decrease the flow of fluid therethrough. The modulation should be applied to slow response or low required accuracy control loops like temperature, level, cascaded slave master control systems such as a distillation overhead flywheel control.

Therefore, in at least one aspect, the present invention may be characterized, as providing a process for controlling at least one steady process condition of a chemical processing unit by: passing a fluid through a turbine in order to provide the fluid with a flow associated with at least one process condition of a chemical processing unit; rotating a turbine wheel within the turbine, the turbine wheel configured to transmit rotational movement to an electrical generator; generating electricity with the turbine; and, modulating a resistance of the turbine in order to adjust the flow of the fluid through the turbine, wherein a response time of at least one steady state process condition to a new steady state process condition of at least 10% difference is at least one second to reach 50% of the difference between the at least one steady state process condition and the new steady state process condition after modulating the resistance of the turbine.

In another aspect, the present invention may be characterized, as providing a process for controlling at least one steady state process condition of a chemical processing unit by: passing a fluid through a turbine in order to provide the fluid with a flow associated with at least one process condition of a chemical processing unit; generating electricity with the turbine by rotating a turbine wheel within the turbine with the fluid, the turbine wheel configured to transmit rotational movement to an electrical generator; and, modulating a resistance of the turbine in order to adjust the flow of the fluid through the turbine, wherein a response time of at least one steady state process condition to a new steady state process condition of at least 10% difference is at least one second to reach 50% of the difference between the at least one steady state process condition and the new steady state process condition after modulating the resistance of the turbine.

Additional aspects, embodiments, and details of the invention, all of which may be combinable in any manner, are set forth in the following detailed description of the invention.

DETAILED DESCRIPTION OF THE DRAWINGS

Figure 2:
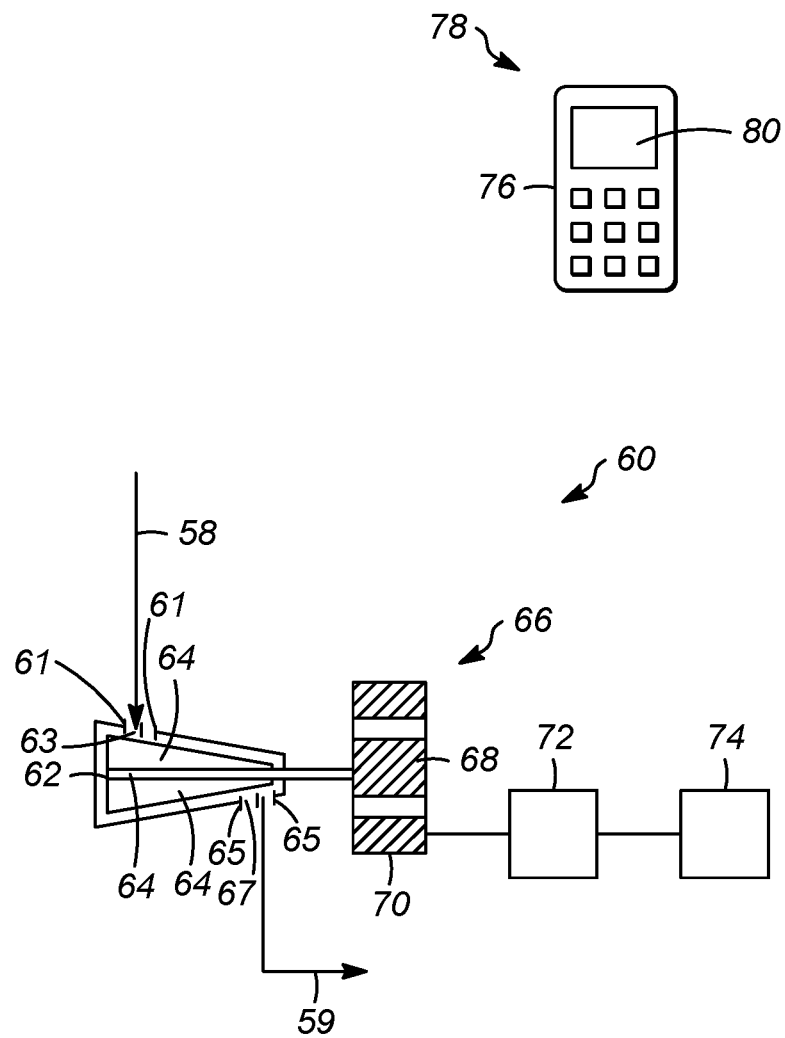

One or more exemplary embodiments of the present invention will be described below in conjunction with the following drawing figures in which:

FIG. 1 shows a hydroprocessing reactor used in accordance with one or more embodiments of the present invention; and, FIG. 2 shows a schematic drawing of a reboiler according to one or more aspects of the present invention.

DETAILED DESCRIPTION OF THE INVENTION

As mentioned above, the present invention utilizes one or more turbines to provide "slow control" over adjusting a steady state process condition. In order to adjust the steady state process condition, the resistance of the turbine is modulated, which slows the system's response and provides control for one or more process conditions such as composition, temperature, process levels (feed, products, both final and intermediate, reactants, and/or catalyst). In addition, the turbine can recover energy, in the form of electrical energy, which is used elsewhere in the processing unit.

With these general principles in mind, one or more embodiments of the present invention will be described with the understanding that the following description is not intended to be limiting.

Turning to FIG. 1, in at least one embodiment, a turbine is used in association with a quench stream, for example in a hydroprocessing reactor 100. As used herein, the term "hydroprocessing" can refer to processing one or more hydrocarbons in the presence of hydrogen, and can include hydrotreating and/or hydrocracking. As used herein, the term "hydrocracking" can refer to a process breaking or cracking bonds of at least one long-chain hydrocarbon in the presence of hydrogen and at least one catalyst into lower molecular weight hydrocarbons. As used herein, the term "hydrotreating" can refer to a process including contacting a hydrocarbon feedstock with hydrogen gas in the presence of one or more suitable catalysts for the removal of heteroatoms, such as sulfur, nitrogen and metals from a hydrocarbon feedstock. In hydrotreating, hydrocarbons with double and triple bonds may be saturated, and aromatics may also be saturated, as some hydrotreating processes are specifically designed to saturate aromatics.

As depicted in FIG. 1, a hydroprocessing reactor 100 that is used in accordance with the present invention is a multi-fixed bed vessel 101 which, as is known, comprises multiple catalyst beds 102, 104, 106, 108 that are separated from each other by pre-bed spaces 112, 114, 116 (also referred to as quench zones. In an exemplary embodiment, each of the catalyst beds 102, 104, 106, 108 contain a hydrotreating catalyst. Hydrotreating catalysts are well known and typically comprise molybdenum (Mo), tungsten (W), cobalt (Co), and/or nickel (Ni) on a support comprised of y-alumina. The particular type of hydrotreating catalyst is not necessary for the understanding or practicing of the present invention.

As illustrated, a feed stream 118 is introduced to the hydroprocessing reactor 100, preferably at the top of the vessel 101. A hydrogen-containing stream 120 is split in a plurality of streams into hydrogen rich streams 122, 124, 126, 128. Preferably, the hydrogen-containing stream 120 is a hydrogen-rich stream. As used herein, the term "rich" means an amount generally of at least 50%, and preferably 70%, by volume, of a compound or class of compounds in a stream. The hydrogen-containing stream 120 may contain recycle hydrogen from the hydroprocessing reactor 100, make-up hydrogen, or a combination of recycle hydrogen and make-up hydrogen.

A first hydrogen rich stream 122 is combined with the feed stream 118, preferably upstream of any heat exchangers or furnaces. The remaining hydrogen rich streams 124, 126, 128 are used as quench streams 130, 132, 134 and injected into the pre-bed spaces 112, 114, 116 of the hydroprocessing reactor 100. In order to reduce the pressure and control the flow of the quench streams 130, 132, 134, turbines 60a, 60b, 60c are used. These turbines 60a, 60b, 60c are, for example, the turbine 60 shown in FIG. 2 (discussed below). The turbines 60a, 60b, 60c may each be in communication with a temperature sensor 136 configured to measure a temperature of one of the pre-bed spaces 112, 114, 116 and relay the temperature to the turbines 60a, 60b, 60c to adjust the flow of the respective quench streams 130, 132, 134.

Thus, the hydrogen rich streams 124, 126, 128 will enter each of the turbines 60a, 60b, 60c and rotate turbine wheels therein (see, FIG. 2), thereby reducing the pressure and temperature of the hydrogen rich streams 124, 126, 128 and extracting energy from the hydrogen rich streams 124, 126, 128. The lower pressure and temperature quench streams 130, 132, 134 are injected into pre-bed spaces 112, 114, 116 of the reactor 100 and control the temperature of the catalyst beds 104, 106, 108 within the reactor 100.

In the hydroprocessing reactor 100, the flow rate of the stream coming from the turbine 60 can be adjusted to change a process condition in the hydroprocessing reactor 100. For example, the flow rate of the quench streams 130, 132, 134 may be adjusted to change the temperature of the catalyst beds 102, 104, 106, 108 within the reactor 100. Accordingly, in changing these process conditions, it is contemplated that the changes are "slow control" in which the desired change occurs at a relatively slow pace. For example, with respect to the hydrotreating reactor 100, it is contemplated that a response time to reach half way (i.e., 50% of a difference) between the new (or target) temperature within the hydrotreating reactor 100 and an original (or starting) temperature within the hydrotreating reactor 100, when the desired (or target) temperature differs from the original (or stating) temperature by at least 10%, is at least one second, or at least ten seconds, or at least 1 minute, or at least 10 minutes, or one hour or greater. In other words, when the new temperature of the reactor differs from the current temperature within the reactor, the turbine provides a process that takes at least one second, or at least ten seconds, or at least 1 minute, or at least 10 minutes, or one hour or greater, for half of the change to completed. One of ordinary skill in the art will be able to determine the process conditions and response time for the dynamic processes associated with the present invention.

Turning to FIG. 2, the turbine 60 includes a turbine wheel 62 with blades 64 configured to optionally transfer, or transmit, rotational movement, created by the flow of the stream passed through the turbine wheel 62, to an electrical generator 66. The electrical generator 66 generally includes a first winding 68, in communication with the turbine wheel 62 and a second winding 70 surrounding the first winding 68. As is known, the rotation of the first winding 68 relative to the second winding 70 will generate an electrical current. Although not depicted as such, the electrical generator 66 could include a permanent magnet instead of one of the windings, 68, 70. Such electrical generators are known in the art.

Additionally, the turbine 60 may include a processor 72 configured to measure an amount of electricity generated by the turbine 60 and a transmitter 74 configured to transmit information associated with the amount of electricity generated by the turbine 60 to a computer 76 at a control center 78. The specific configuration of the turbine 60 is not essential to the practicing of the present invention provided that the turbine 60 allow for the desired pressure reduction and conversion of energy from the pressure reduction to electricity. Exemplary turbines and further details are described in U.S. Pat. Nos. 4,625,125, 4,694,189, 4,754,156, and 9,203,969 all of which are incorporated herein by reference.

Thus, one of the hydrogen rich streams 124, 126, 128 from FIG. 1 will enter the turbine 60, via conduit 58, at an inlet and rotate the turbine wheel 62, thereby reducing the pressure and temperature of the hydrogen-rich stream and, preferably also extracting energy from same. The lower pressure stream 59, taken from the outlet of the turbine 60, is one of the quench streams 130, 132, 134 that is injected into the pre-bed spaces 112, 114, 116 of the reactor 100 and to control the temperature of the catalyst beds 104, 106, 108 within the reactor 100. (See, FIG. 1). In the various processes of the present invention, in order to adjust the flow of fluid through the turbine 60 and adjust at least one steady state process condition of the chemical processing unit, such as the hydroprocessing reactor 100, the resistance of the turbine 60 is modulated, or adjusted.

For example, the turbine 60 may include a plurality of variable guide vanes 61 disposed at the inlet 63 of the turbine 60. The resistance of the turbine 60 is adjusted by changing an orientation of the variable guide vanes 61. Similarly, a plurality of variable guide vanes 65 may be disposed at the outlet 67 of the turbine 60. The resistance of the turbine 60 is adjusted by changing an orientation of the variable guide vanes 65. Alternatively, it is contemplated that the turbine 60 is a variable nozzle turbine. In such an embodiment, the resistance of the turbine 60 is adjusted by changing an orientation of the variable nozzle turbine. As will be appreciated, by adjusting the vanes 61, 65 of the turbine 60, the flow of the stream passing through the vanes 61, 65 will be adjusted (by either increasing the surface area of the vanes 61, 65 blocking or reducing the surface area of the vanes 61, 65). This will, in turn, increase or decrease the flow of the vapor stream—increasing the surface area to block the flow or decreasing the surface area to reduce the interference with the flow. As example of a turbine with adjustable vanes in U.S. Pat. No. 6,261,055.

Furthermore, it is also contemplated that the resistance of the turbine 60 is adjusted with the turbine wheel 62, for example, by exerting a force on the turbine wheel 62 increasing the energy needed to rotate the turbine wheel 62. Similarly, it is further contemplated that the resistance of the turbine 60 is adjusted by applying an electromagnetic resistance to the rotor thereby varying the rotor torque on the turbine wheel 62. An example of this type of adjustment of the resistance is described in U.S. Pat. No. 8,404,918.

Accordingly, in some embodiments, the process according to the present invention comprises directing a portion of a gaseous process stream through one or more variable-resistance turbines to control the flowrate of the gas process stream and, optionally, generate electric power therefrom; controlling a pressure and temperature of the gaseous process stream so that the gas exiting the power-recovery turbine remains in the gas phase; and measuring the flowrate or controlling the flowrate or both using a variable nozzle turbine, inlet variable guide vanes, or direct coupled variable electric load, to name a few, to vary the resistance to flow through the turbine. Again, the resistance to rotation of the variable-resistance turbine can be varied by an external variable load electric circuit which is in a magnetic field from a magnet(s) that is rotating on the turbine. As more load is put on the circuit, there is more resistance to rotation on the turbine. This in turn imparts more pressure drop across the turbine and slows the process stream flow. An algorithm in the device can also calculate the actual flow through the device by measuring the turbine RPMs and the load on the circuit. The resistance to rotation flow can also be varied by variable position inlet guide vanes. In some embodiments, the power will be generated via power-recovery turbines with variable resistance to flow made possible by either guide vanes or variable load on the electrical power generation circuit. An algorithm to calculate actual flow using the guide vanes position, power output and RPMs can be used.

The at least one steady state process condition that is adjusted may be a temperature, a pressure, such as a partial pressure, a level or reactant, chemical, catalyst, or feed, used in the chemical processing unit. If slow control response of the turbine is an issue then the use of the turbine is limited to slow responding or "loose" control point applications. A slow responding application is contemplated to have a response time to reach half way (i.e., 50% of a difference) between a new (or target) steady state condition (e.g., temperature, pressure, flow rate) from an original (or starting) steady state condition when the new (or target) condition differs from the original (or stating) condition of at least 10%, is of at least one second, or even greater, for example, ten seconds, at least one minute, at least ten minutes, or an hour or more, for half of the change to completed.

In addition to adjusting, by using the turbine 60, the processes of the present invention optimally generate electricity as a result of the rotation of the turbine wheel 62 within the turbine 60. Information associated with the generation of electricity may be utilized to control the chemical processing unit. Additionally, information associated with conditions outside of the turbine can be factored in and used to determine a power generated target based in part on the information associated with conditions outside of the turbine. Information associated with a throughput of the chemical processing unit can also be utilized to determine the power generated target value. In some processes, the throughput of the processing unit is maintained while the resistance of the turbine is adjusted. Multiple turbines may be utilized within the chemical processing unit and thus the process may include determining a total power generated value based upon the amount of electricity generated by the turbines, as well as displaying the total power generated value on the at least one display screen.

As will be appreciated, the chemical processing units used in the present processes, such as the hydrotreating reactor 100, utilize a process control system. The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor reading information from, and writing information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information relative to an amount of electricity generated by the turbines 60. It is contemplated that the turbine determines the amount of electricity it has generated, or alternatively, the process control system receiving the information determines the amount of electricity that has been generated. In either configuration, the amount of the electricity generated by the turbines 60 is displayed on at least one display screen 80 (for example in communication with the computer 76 in the control center 78). If the processing unit comprises a plurality of turbines 60, it is further contemplated that the processing control system receives information associated with the amount of electricity generated by each of the turbines 60. The processing control system determines a total power generated based upon the information associated with the each of the turbines 60 and displays that the total power generated. The total power generated may be displayed instead of or in conjunction with the display of the power generated by individual turbines 60.

As discussed above, the recovery of the electricity is oftentimes based upon the need to remove energy form the streams that has already been added to the streams in the processing units. Thus, it is contemplated that the processes according to the present invention provide for the various process conditions associated with the processing units to be adjusted into order to lower the energy added to the steam initially. It is contemplated that the process control system receives information associated with the throughput of the processing unit, and determines a target power generated value for the turbines 60, since the electricity represents energy that is typically added to the overall processing unit. The determination of the target power generated value may be done when the electricity is at or near a predetermined level. Thus, the process control system will analyze one or more changes to the various process conditions associated with the processing unit to lower the amount of energy recovered by the turbines 60. Preferably, the process conditions are adjusted without adjusting the throughput of the processing unit. This allows for the processing unit to have the same output, but with a lower operating input. The process control software may calculate and display the difference between the target power generated value and the total power generated on the at least one display screen 80.

By using modulating the resistance of the turbine to adjust one or more steady state process conditions, the turbine allows for a "slow control" over the adjustment of the steady state process condition.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for controlling at least one steady process condition of a chemical processing unit, the process comprising passing a fluid through a turbine in order to provide the fluid with a flow associated with at least one process condition of a chemical processing unit; rotating a turbine wheel within the turbine, the turbine wheel configured to transmit rotational movement to an electrical generator; generating electricity with the turbine; and, modulating a resistance of the turbine in order to adjust the flow of the fluid through the turbine, wherein a response time of at least one steady state process condition to a new steady state process condition of at least 10% difference is at least one second to reach 50% of the difference between the at least one steady state process condition and the new steady state process condition after modulating the resistance of the turbine. An embodiment of the invention is one, any or all of prior embodiments in this paragraph up through the first embodiment in this paragraph, wherein the response time for the steady state process condition to reach 50% of the difference between the at least one steady state process condition and the new steady state process condition after modulating the resistance of the turbine is at least ten seconds. An embodiment of the invention is one, any or all of prior embodiments in this paragraph up through the first embodiment in this paragraph, wherein the response time for the steady state process condition to reach 50% of the difference between the at least one steady state process condition and the new steady state process condition after modulating the resistance of the turbine is at least one minute. An embodiment of the invention is one, any or all of prior embodiments in this paragraph up through the first embodiment in this paragraph, wherein the turbine has an inlet, and wherein a plurality of variable guide vanes is disposed at the inlet of the turbine, and wherein the resistance of the turbine is modulated by changing an orientation of the variable guide vanes. An embodiment of the invention is one, any or all of prior embodiments in this paragraph up through the first embodiment in this paragraph, wherein the turbine has an outlet, and wherein a plurality of variable guide vanes is disposed at the outlet of the turbine, and wherein the resistance of the turbine is modulated by changing an orientation of the variable guide vanes. An embodiment of the invention is one, any or all of prior embodiments in this paragraph up through the first embodiment in this paragraph, wherein the turbine comprises a variable nozzle turbine, and wherein the resistance of the turbine is modulated by changing an orientation of the variable nozzle turbine. An embodiment of the invention is one, any or all of prior embodiments in this paragraph up through the first embodiment in this paragraph, wherein the resistance of the turbine is adjusted with the turbine wheel. An embodiment of the invention is one, any or all of prior embodiments in this paragraph up through the first embodiment in this paragraph, wherein the resistance of the turbine is adjusted with an electromagnetic resistance applied to a rotor thereby varying a rotor torque, the rotor in communication with the turbine wheel. An embodiment of the invention is one, any or all of prior embodiments in this paragraph up through the first embodiment in this paragraph, wherein the at least one steady state process condition of the chemical processing unit comprises a temperature. An embodiment of the invention is one, any or all of prior embodiments in this paragraph up through the first embodiment in this paragraph, wherein the at least one steady state process condition of the chemical processing unit comprises a pressure. An embodiment of the invention is one, any or all of prior embodiments in this paragraph up through the first embodiment in this paragraph, wherein the at least one steady state process condition of the chemical processing unit comprises a liquid level of a chemical used in the chemical processing unit.

A second embodiment of the invention is a process for controlling at least one steady state process condition of a chemical processing unit, the process comprising passing a fluid through a turbine in order to provide the fluid with a flow associated with at least one process condition of a chemical processing unit; generating electricity with the turbine by rotating a turbine wheel within the turbine with the fluid, the turbine wheel configured to transmit rotational movement to an electrical generator; and, modulating a resistance of the turbine in order to adjust the flow of the fluid through the turbine, wherein a response time of at least one steady state process condition to a new steady state process condition of at least 10% difference is at least one second to reach 50% of the difference between the at least one steady state process condition and the new steady state process condition after modulating the resistance of the turbine. An embodiment of the invention is one, any or all of prior embodiments in this paragraph up through the second embodiment in this paragraph, wherein the turbine has an inlet, and wherein a plurality of variable guide vanes is disposed at the inlet of the turbine and wherein the resistance of the turbine is modulated by changing an orientation of the variable guide vanes. An embodiment of the invention is one, any or all of prior embodiments in this paragraph up through the second embodiment in this paragraph, wherein the turbine has an outlet, and wherein a plurality of variable guide vanes is disposed at the outlet of the turbine, and wherein the resistance of the turbine is modulated by changing an orientation of the variable guide vanes. An embodiment of the invention is one, any or all of prior embodiments in this paragraph up through the second embodiment in this paragraph, wherein the turbine comprises a variable nozzle turbine, and wherein the resistance of the turbine is modulated by changing an orientation of the variable nozzle turbine. An embodiment of the invention is one, any or all of prior embodiments in this paragraph up through the second embodiment in this paragraph, wherein the resistance of the turbine is adjusted with the turbine wheel. An embodiment of the invention is one, any or all of prior embodiments in this paragraph up through the second embodiment in this paragraph, wherein the resistance of the turbine is adjusted with an electromagnetic resistance applied to a rotor thereby varying a rotor torque, the rotor in communication with the turbine wheel. An embodiment of the invention is one, any or all of prior embodiments in this paragraph up through the second embodiment in this paragraph, wherein the at least one steady state process condition of the chemical processing unit is selected from the group consisting of a temperature; a pressure; and, a liquid level of a chemical used in the chemical processing unit. An embodiment of the invention is one, any or all of prior embodiments in this paragraph up through the second embodiment in this paragraph, further comprising receiving information from the turbine relative to an amount of electricity generated by the turbine; and, displaying the amount of electricity generated by the turbine on at least one display screen. An embodiment of the invention is one, any or all of prior embodiments in this paragraph up through the second embodiment in this paragraph, further comprising receiving information associated with conditions outside of the turbine; and, determining a power generated target based in part on the information associated with conditions outside of the turbine. An embodiment of the invention is one, any or all of prior embodiments in this paragraph up through the second embodiment in this paragraph, further comprising receiving information associated with a throughput of the chemical processing unit; and, wherein the power generated target value is determined based in part on the information associated with the throughput of the chemical processing unit. An embodiment of the invention is one, any or all of prior embodiments in this paragraph up through the second embodiment in this paragraph, further comprising maintaining the throughput of the chemical processing unit while adjusting the resistance of the turbine. An embodiment of the invention is one, any or all of prior embodiments in this paragraph up through the second embodiment in this paragraph, wherein the chemical processing unit comprises a plurality of turbines each configured to generate electricity, and wherein the process comprises determining a total power generated value based upon the amount of electricity generated by the turbines; and, displaying the total power generated value on the at least one display screen.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for controlling at least one steady state process condition of a chemical processing unit, the process comprising:
passing a fluid through a turbine in a quench line of a hydroprocessing reactor in order to provide the fluid with a flow associated with the at least one steady state process condition of the hydroprocessing reactor;
rotating a turbine wheel within the turbine, the turbine wheel configured to transmit rotational movement to an electrical generator;
generating electricity with the turbine; and,
modulating a resistance of the turbine in order to adjust the flow of the fluid in the quench line through the turbine,
wherein a response time of the at least one steady state process condition to a new steady state process condition of at least 10% difference is at least one second to reach 50% of the difference between the at least one steady state process condition and the new steady state process condition after modulating the resistance of the turbine, and,
wherein the at least one steady state process condition of the hydroprocessing reactor is a temperature.

2. The process of claim 1, wherein the response time for the steady state process condition to reach 50% of the difference between the at least one steady state process condition and the new steady state process condition after modulating the resistance of the turbine is at least ten seconds.

3. The process of claim 1, wherein the response time for the steady state process condition to reach 50% of the difference between the at least one steady state process condition and the new steady state process condition after modulating the resistance of the turbine is at least one minute.

4. The process of claim 1, wherein the turbine has an inlet, and wherein a plurality of variable guide vanes is disposed at the inlet of the turbine, and wherein the resistance of the turbine is modulated by changing an orientation of the variable guide vanes.

5. The process of claim 1, wherein the turbine has an outlet, and wherein a plurality of variable guide vanes is disposed at the outlet of the turbine, and wherein the resistance of the turbine is modulated by changing an orientation of the variable guide vanes.

6. The process of claim 1, wherein the turbine comprises a variable nozzle turbine, and wherein the resistance of the turbine is modulated by changing an orientation of the variable nozzle turbine.

7. The process of claim 1, wherein the resistance of the turbine is adjusted with the turbine wheel.

8. The process of claim 1, wherein the resistance of the turbine is adjusted with an electromagnetic resistance applied to a rotor thereby varying a rotor torque, the rotor in communication with the turbine wheel.

9. A process for controlling at least one steady state process condition of a chemical processing unit, the process comprising:
passing a fluid through a turbine in a quench line of a hydroprocessing reactor order to provide the fluid with a flow associated with the at least one steady state process condition of the hydroprocessing reactor;
generating electricity with the turbine by rotating a turbine wheel within the turbine with the fluid, the turbine wheel configured to transmit rotational movement to an electrical generator; and,
modulating a resistance of the turbine in order to adjust the flow of the fluid in the quench line through the turbine,
wherein a response time of the at least one steady state process condition to a new steady state process condition of at least 10% difference is at least one second to reach 50% of the difference between the at least one steady state process condition and the new steady state process condition after modulating the resistance of the turbine, and
wherein the at least one steady state process condition of the hydroprocessing reactor is a temperature.

10. The process of claim 9, wherein the turbine has an inlet, and wherein a plurality of variable guide vanes is disposed at the inlet of the turbine and wherein the resistance of the turbine is modulated by changing an orientation of the variable guide vanes.

11. The process of claim 9, wherein the turbine has an outlet, and wherein a plurality of variable guide vanes is disposed at the outlet of the turbine, and wherein the resistance of the turbine is modulated by changing an orientation of the variable guide vanes.

12. The process of claim 9, wherein the turbine comprises a variable nozzle turbine, and wherein the resistance of the turbine is modulated by changing an orientation of the variable nozzle turbine.

13. The process of claim 9, wherein the resistance of the turbine is adjusted with the turbine wheel.

14. The process of claim 9, wherein the resistance of the turbine is adjusted with an electromagnetic resistance applied to a rotor thereby varying a rotor torque, the rotor in communication with the turbine wheel.

15. The process of claim 9, further comprising:
receiving information from the turbine relative to an amount of electricity generated by the turbine; and,
displaying the amount of electricity generated by the turbine on at least one display screen.

16. The process of claim 9, further comprising:
receiving information associated with conditions outside of the turbine; and,
determining a power generated target based in part on the information associated with conditions outside of the turbine.

17. The process of claim 16, further comprising:
receiving information associated with a throughput of the hydroprocessing reactor; and,
wherein the power generated target value is determined based in part on the information associated with the throughput of the hydroprocessing reactor.

18. The process of claim 17, further comprising:
maintaining the throughput of the hydroprocessing reactor while adjusting the resistance of the turbine.

19. The process of claim 9, wherein the hydroprocessing reactor comprises a plurality of turbines each configured to generate electricity, and wherein the process comprises:
determining a total power generated value based upon the amount of electricity generated by the turbines; and, displaying the total power generated value on at least one display screen.

* * * * *